(12) United States Patent
Cruikshank et al.

(10) Patent No.: US 9,434,205 B2
(45) Date of Patent: Sep. 6, 2016

(54) METHOD FOR LAMINATING A PROTECTIVE LAYER OVER A PRINTED THERMOPLASTIC SUBSTRATE AND SECURITY DOCUMENT MADE THEREFROM

(71) Applicant: Canadian Bank Note Company, Limited, Ottawa (CA)

(72) Inventors: David Cruikshank, Carleton Place (CA); Larry O'Gorman, Ottawa (CA); Sean Connelly, Ottawa (CA); Thivaharan Thurailingam, Kanata (CA)

(73) Assignee: Canadian Bank Note Company, Limited, Ottawa (CA)

( * ) Notice: Subject to any disclaimer, the term of this patent is extended or adjusted under 35 U.S.C. 154(b) by 0 days.

(21) Appl. No.: 14/484,259

(22) Filed: Sep. 12, 2014

(65) Prior Publication Data

US 2016/0075167 A1    Mar. 17, 2016

(51) Int. Cl.

| | | |
|---|---|---|
| *B32B 37/00* | (2006.01) | |
| *B42D 25/455* | (2014.01) | |
| *B42D 25/46* | (2014.01) | |
| *B29C 59/02* | (2006.01) | |

(Continued)

(52) U.S. Cl.
CPC ............ *B42D 25/455* (2014.10); *B29C 59/022* (2013.01); *B29C 65/08* (2013.01);
(Continued)

(58) Field of Classification Search
CPC . B29C 59/022; B29C 65/08; B32B 38/0012; B32B 38/145; B32B 38/06; B32B 37/182; B42D 25/455; B42D 25/46

USPC ................... 156/73.1, 209, 219, 244.11, 277
See application file for complete search history.

(56) References Cited

U.S. PATENT DOCUMENTS 4,250,217 A * 2/1981 Greenaway .................... 428/161
4,773,677 A * 9/1988 Plasse .............................. 283/77

(Continued)

FOREIGN PATENT DOCUMENTS

EP        2056583 A1    5/2009
JP        01-156093 A   6/1989

(Continued)

OTHER PUBLICATIONS

International Search Report issued for International Patent Application No. PCT/CA2011/050812, dated Aug. 21, 2012, now pending U.S. Appl. No. 13/381,666.

(Continued)

*Primary Examiner* — James Sells
(74) *Attorney, Agent, or Firm* — Oppedahl Patent Law Firm LLC

(57) ABSTRACT

A method is provided for laminating a thermoplastic layer to at least a print area of a printed thermoplastic substrate (e.g. a polycarbonate substrate and laminate layer). A printed thermoplastic substrate comprises a print area on which an image (e.g. a portrait) is printed (e.g. by inkjet printing), the print area comprising a pattern of recessed cells separated by bridges. Each cell comprises recessed image receiving surfaces below a nominal surface of the print area for holding the ink of the printed image. The bridges have surface areas above the ink and the surface areas of the bridges comprising enough of the print area to provide lamination bonding areas. Using heat and pressure, a thermoplastic layer is laminated to at least the print area of the thermoplastic substrate to form lamination bonding between the thermoplastic layer and the lamination bonding areas provided by the surface areas of the bridges.

20 Claims, 1 Drawing Sheet

(51) Int. Cl.
*B29C 65/08* (2006.01)
*B32B 38/00* (2006.01)
*B32B 37/18* (2006.01)
*B32B 38/06* (2006.01)

(52) U.S. Cl.
CPC ......... *B32B38/0012* (2013.01); *B32B 38/145* (2013.01); *B42D 25/46* (2014.10); *B29C 2059/023* (2013.01); *B32B 37/182* (2013.01); *B32B 38/06* (2013.01); *B32B 2038/0016* (2013.01); *B32B 2307/412* (2013.01); *B32B 2425/00* (2013.01); *B32B 2429/00* (2013.01)

(56) References Cited

U.S. PATENT DOCUMENTS

| | | |
|---|---|---|
| 5,760,961 A | 6/1998 | Tompkin |
| 8,199,913 B2 | 6/2012 | Alasia et al. |
| 2003/0211296 A1 | 11/2003 | Jones |
| 2007/0278785 A1* | 12/2007 | Nemeth .................. B41M 3/14 283/78 |
| 2013/0171423 A1* | 7/2013 | Cruikshank ............ B42D 15/00 428/172 |

FOREIGN PATENT DOCUMENTS

| | | |
|---|---|---|
| WO | 99/55530 A1 | 11/1999 |
| WO | 2006007635 A1 | 1/2006 |

OTHER PUBLICATIONS

International Search report for International Application No. PCT/CA2014/050937, mailed May 13, 2015.

Written Opinion for International Application No. PCT/CA2014/050937, mailed May 13, 2015.

* cited by examiner

METHOD FOR LAMINATING A PROTECTIVE LAYER OVER A PRINTED THERMOPLASTIC SUBSTRATE AND SECURITY DOCUMENT MADE THEREFROM

FIELD OF THE INVENTION

The invention pertains to means for establishing an adhesive free protective layer over a thermoplastic substrate having an image printed on the surface of the substrate.

BACKGROUND

Security documents having thermoplastic substrates, such as identification cards, licenses, government service cards, passport pages and others and the web sheets they are cut from, normally include one or more printed personalization images (e.g. a printed photograph of a cardholder) used to identify the cardholder or otherwise authenticate the security document which may be printed onto a surface of the substrate using inkjet printing, for example, using an ink which may be single or multi-coloured and/or ultraviolet (UV) curable.

Prior to the invention of the subject matter of the Applicant's co-pending U.S. application Ser. No. 13/381,666 filed on 28 Dec. 2011 (published on 4 July, 2013 under publication no. 2013/0171423), the content of which is incorporated by reference, such images were printed onto a smooth or matte surface of the thermoplastic substrate of the card. Optionally, a clear protective coating was applied over it, or a patch was glued over it, to try to improve the durability of the printed image. However, both the printed image and any protective coating or glued patch (often referred to as a hot laminate patch) applied to such smooth or matte surface does not durably adhere to such a surface so their attachment is inherently weak. Such coatings and patches are prone to detach and, thus, they are unable to effectively protect the printed image. Optimally, such printed images would be protected by embedding them between layers of the card substrate. However, prior to the present invention this could not be achieved because the ink of the print image prevents a similar thermoplastic layer from bonding to it. Instead, only a relatively weak adherence occurs between the surfaces of a printed thermoplastic layer and another thermoplastic layer applied over the printed layer.

The Applicant previously invented a method of printing a durable image on a thermoplastic substrate by preconfiguring the surface of the thermoplastic substrate to have a pattern of recessed image receiving surfaces below a nominal surface of the substrate, as described in said co-pending U.S. application Ser. No. 13/381,666. Advantageously, the recessed surface areas in which the image is printed serve to increase the durability of the printed image as compared to printing the image on the normal (smooth or matte) surface of a thermoplastic substrate. However, that invention, while improving the durability of an image applied to a thermoplastic substrate did not contemplate or address any need or desirability to provide further protection to an image printed in accordance with that invention.

SUMMARY OF THE INVENTION

In accordance with the present invention, a method is provided for laminating a thermoplastic layer to a printed thermoplastic substrate. A printed thermoplastic substrate comprises a print area on which an image is printed. The print area comprises a pattern of cells separated by bridges, each cell comprising recessed image receiving surfaces below a nominal surface of the print area of the thermoplastic substrate which hold the ink of the printed image and the bridges having surface areas above the ink, and the surface areas of the bridges comprise enough of the print area to provide lamination bonding areas. Using heat and pressure, a thermoplastic layer is laminated to at least the print area of the thermoplastic substrate to form lamination bonding between the thermoplastic layer and the lamination bonding areas provided by the surface areas of the bridges.

The printed image may be a portrait, with the thermoplastic layer being see-through. Preferably, the surface area of the bridges is in a range of 10%-60% of the print area. Alternatively, the surface area of the bridges may be in a range of 20%-50% of the print area, or a range of 30%-40% of the print area. More particularly, the surface area of the bridges may be about one third of the print area and the ink of the printed image may fill the cells by about one third.

Each of the thermoplastic substrate and the thermoplastic layer may comprise one or more layers of polycarbonate. The thermoplastic substrate may be pre-formed by means of a process selected from the group consisting of intaglio embossing, embossing during a film extrusion process, a hot stamp process, ultrasonic lamination, laser ablation and mechanical ablation. Ink jet printing, for example, may be used to print a portrait image, for example, and the relative amount of the print area comprising the surface areas of the bridges is chosen to be sufficiently small to provide a high quality for the printed image.

In accordance with another embodiment of the invention a method is provided for laminating a see-through thermoplastic layer over at least a printed area of a thermoplastic substrate. The thermoplastic layer is laminated to the printed area of the thermoplastic substrate to form lamination bonding between the thermoplastic layer and the thermoplastic substrate. The printed area of the thermoplastic substrate comprises embossments recessed below the surface of the printed area and separated by bridges comprising surface areas for lamination bonding with the thermoplastic substrate, and the recessed embossments contain ink defining a printed image (for example, a portrait) in the printed area. The percentage of the printed area comprising the surface areas of the bridges is selected for optimization of the quality of the printed image, e.g. the percentage of the printed area comprising the surface areas of the bridges being in the range of 10%-60%, 20-50% or 30%-40%, and optimization of the lamination bonding between the thermoplastic layer and the thermoplastic substrate.

BRIEF DESCRIPTION OF THE DRAWINGS

The invention is described in detail below with reference to the following drawings drawn to facilitate illustration of features described herein and not to scale.

DETAILED DESCRIPTION

Surprisingly, the applicant has determined that a thermoplastic protective layer can be successfully bonded by lamination to a printed thermoplastic substrate having a surface configured according to its said co-pending application Ser. No. 13/381,666. That is, the surface includes a cell pattern of recessed image receiving surfaces such that the cells retain the ink of the printed image and bridges comprised of the thermoplastic substrate material separating the cells. In addition, in order to be able to achieve a bonded lamination of a thermoplastic layer to the printed substrate, the surface area of the bridges must occupy a sufficient amount of the printed surface area. If a sufficient bridge surface area relative to the area of the printed cell pattern is met, lamination bonding occurs between the thermoplastic material of the substrate and the thermoplastic material of the protective layer. Also, the percentage of the printed area comprising the surface areas of the bridges can be selected for optimization of the quality of the printed image.

Figure 1:
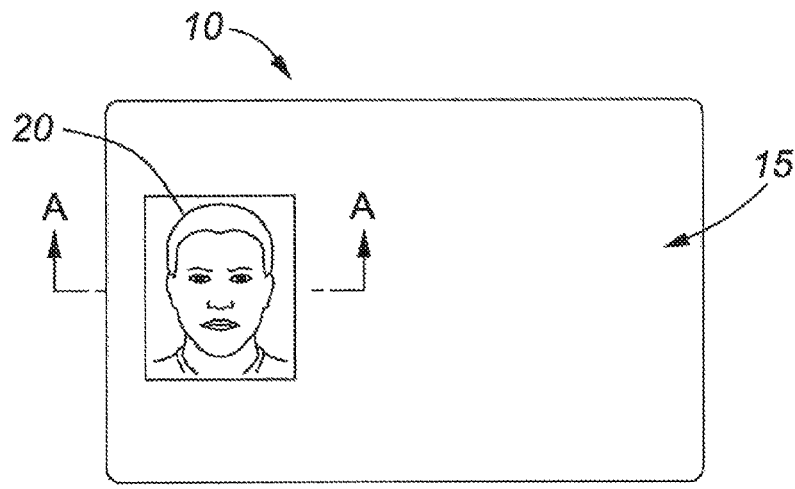
FIG. 1 illustrates a plan view of an exemplary security document comprising a thermoplastic substrate to which a personalization image has been printed and a protective thermoplastic layer has been laminated to the substrate in accordance with the present invention.
Figure 2:
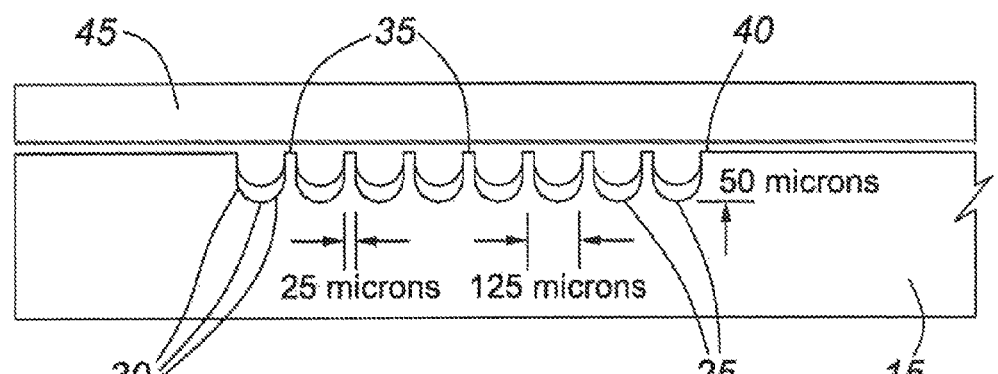
FIG. 2 illustrates a modified (pre-lamination) sectional view, at section A-A, of the security document of FIG. 1, modified to show the thermoplastic protective layer above a printed image in a print area of a thermoplastic substrate (pre-lamination), wherein the print area comprises a pattern of cells and bridges separating the cells, each cell having recessed image receiving surfaces below a nominal surface of the substrate print area.

Referring to the embodiments shown by FIGS. 1 and 2, a document in the form of an identification card 10 includes an image 20 that has been printed onto a thermoplastic substrate 15 of polycarbonate by means of ink jet printing and a thermoplastic protective film layer 45 is laminated to the printed surface of the substrate 15 in accordance with the invention. Normally, for a printed image that is intended to be visible to a viewer, the thermoplastic layer 45 will be see-through, meaning transparent or semi-transparent, such that an image there below may be discerned, but this is not necessary to the present invention and for a different type of printed image and/or different application, it might be desired to laminate a non-see-through thermoplastic layer over the printed substrate. Although ink jet printing was chosen for this embodiment it is to be understood that other printing methods may be used to print the image onto the substrate including methods using laser toner, solvent inkjet and digital press. The thermoplastic protective layer 45 is bonded to the substrate 15 by a lamination step applying heat and pressure in conventional manner. Here, it is to be noted that applying excessive heat and/or pressure over time should be avoided as this will cause the cell pattern to distort and negatively affect the quality of the printed image.

Advantageously, the printed image is secured in the card in this manner without any need to use an adhesive, or adhesion promoter on the substrate or in the printing of the image, to attach the protective layer 45. Further, the printed image is secured to a substrate which, advantageously, is comprised only of a thermoplastic material such as polycarbonate.

FIG. 2 shows a modified (pre-lamination) cross-sectional view taken at section A-A of FIG. 1, showing the portion of the identification card 10 comprising the printed image 20 in a pre-lamination state with the thermoplastic protective layer 45 positioned above the printed substrate 15, ready for lamination. The print area of the substrate 15 comprises a pattern of cells 25, which may be recessed embossments comprising image receiving surfaces 30 recessed below a nominal surface of the printed area, separated by bridges 35 that provide surface areas for lamination bonding to the thermoplastic protective layer 45. The cells 25 receive and hold the ink of the printed image 20, each cell comprising recessed image receiving surfaces 30 below a nominal surface 40 of the substrate 15. As will be readily understood by persons skilled in the art, relative to the small scale of the cell recesses, being in the order of microns, for example, square cells of 120 microns by 120 microns, the surface level of the thermoplastic substrate 15 may vary over the print area. Taking this into account, it will be understood by the skilled reader that the depths of the cells is not intended to refer to a depth from a surface level at any particular point in the area from which the recesses are formed but, rather, to a depth from a representative surface encompassing the print area. For this reason, the term "nominal surface" is used herein to mean a representative surface level over and immediately surrounding the print area in which the pattern of cells 25 is provided. For the embodiments illustrated by the drawings the bridge surface is recessed 5 microns below the nominal surface of the print area. However, for a different embodiment it may be chosen to use a bridge surface that is roughly at the substrate surface or at the nominal surface of the substrate.

It is to be understood by the reader that the invention pertains to any type of printed document, which comprises a thermoplastic substrate, including a card, sheet or other item. For the illustrated example, the substrate 15 and the protective layer 45 are polycarbonate but other types of thermoplastic material providing characteristics of hardness and durability may be used instead, including PVC (polyvinyl chloride), PET (Polyethylene terephthalate), PETG (copolymerized PET), acrylic, polyolefin (e.g. Teslin™ produced by PPG Industries, Inc.) and similar materials.

In the illustrated embodiments the cells 25 have the same predetermined dimensions, as do the bridges 35 which separate them. The particular cell shape and cell pattern to be used is a matter of choice, as appropriate for the application. For example, a honeycomb pattern, a square, rectangular or diamond cell pattern, a circular cell pattern, an irregular pattern or any other pattern may be preferred for a given application. For an application in which an identification card is to follow the ISO 7810 standard a thermoplastic substrate is used to produce a card having a surface area of 53.98×85.6 square millimeters and a thickness of 0.762 millimeters (762 microns) plus or minus 10%. The size of a print area for a photograph image may also be governed by a standard specification depending upon the application, for example the AAMVA, ICAO or other standard. For example, the AAMVA standard for driver's licenses (2005) specifies a minimum height of 25 mm and width of 22 mm and a maximum height of 40 mm and width of 35 mm.

As an example, for an application of a portrait image in the print area the cells 25 may have a 100-200 micron diameter or nominal width and a depth of 30-70 microns, and the bridges 35 separating the cells may have a nominal width of 20-60 microns. Whereas, for a non-portrait image application such as a serial number or bar code image, the appropriate dimensions may be greater or smaller depending on the desired quality level for the image. For the illustrated embodiment of FIG. 2 of a pre-lamination protective layer 45 and printed substrate 15, the cells 25 are roughly square and have widths of about 125 microns (in this particular example, though not shown, varying from about 123.9 microns to 127.6 microns) and depths of about 50 microns, with bridges about 25 microns wide. As illustrated, the depth of the ink of the printed image (shown as the shaded area at the lower end of each cell) is about one third the depth of the cell 25. For purposes of this invention, as the relative depth of the cell increases the image quality will eventually become poorer due to a shadowing effect which greys the image. These dimensions provide a bridge surface area which is about a third of the print area comprising the ink receiving recesses whereby, for purposes of calculation, the print area is defined to be any designated number of cells (i.e. recesses providing image receiving surfaces) each of which is surrounded by one-half of the bridge area separating the cells. Thus, for the example of FIG. 2, the bridge surface area as a percentage of the print area is calculated as:

$$\frac{\text{Bridge surface area}}{\text{Print area}} = \frac{(\text{Print area} - \text{Cell area})}{\text{Print area}} = \frac{(125+25) \times (125+25) - (125 \times 125)}{(125+25) \times (125+25)}$$
$$= 30.6\% \text{ (i.e. about a third)}$$

Figure 3:
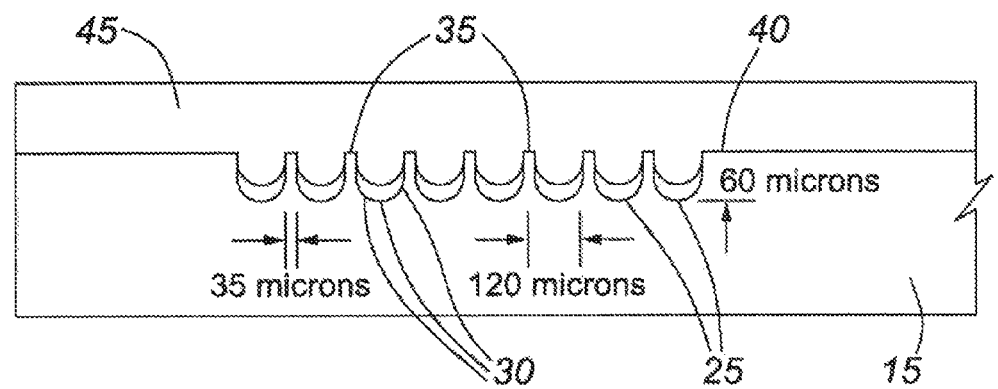
FIG. 3 is a sectional view similar to FIG. 2 but having cells of different dimensions and showing the thermoplastic protective layer laminated (i.e. post-lamination) over the printed image and thermoplastic substrate, wherein the thermoplastic layer and substrate have bonded together at the bridges in the print area of the thermoplastic substrate.

Similarly, for the example of FIG. 3, the bridge area as a percentage of the print area is calculated as:

$$\frac{\text{Bridge surface area}}{\text{Print area}} = \frac{(\text{Print area} - \text{Cell area})}{\text{Print area}} = \frac{(120+35) \times (120+35) - (120 \times 120)}{(120+35) \times (120+35)}$$
$$= 40.1\% \text{ (i.e. about two fifths)}$$

In these examples, the images are printed by ink jet printing using an ultra-violet (UV) light curable coloured ink. The ink is contained within the cells without filling them to such an extent as to cause the ink to spill over onto the bridges and the effective bridge surface area bonds to the thermoplastic protective layer to be laminated there over.

Other portrait examples (not illustrated) that were tested by the applicant, and successfully achieved lamination of the thermoplastic protective layer to the printed thermoplastic substrate, include the samples shown in Table 1 below (wherein the percentage of bridge surface area is calculated according to the foregoing examples):

TABLE 1

| Length of cell | Width of cell | Area of bridge | Area of the cell | Area of the cell with bridge | Bridge Surface area | Cell Depth |
|---|---|---|---|---|---|---|
| 120 | 120 | 25 | 14400 | 21025 | 31.51% | 50 |
| 150 | 150 | 40 | 22500 | 36100 | 37.67% | 80 |
| 103 | 103 | 50 | 10000 | 22500 | 54.68% | 50 |
| 120 | 120 | 40 | 14400 | 25600 | 43.75% | 60 |
| 100 | 100 | 27 | 10000 | 19600 | 38.00% | 50 |
| 132 | 132 | 27 | 14400 | 24025 | 31.08% | 40 |
| 120 | 120 | 32 | 14400 | 23104 | 37.67% | 50 |
| 125 | 125 | 23 | 15625 | 21904 | 28.67% | 50 |

Based on tests performed by the applicant and its experience and knowledge in the making of thermoplastic materials that are printed with a portrait image (e.g. driver's licenses, health cards, identification cards, etc.), it is preferred to use cell dimensions that provide a surface area of the bridges in a range of about 10%-60% of the print area. Depending upon the particular application (i.e. portrait image quality required) it may be more preferable that the surface area of the bridges be in a range of 20%-50% of the print area or, more preferably, in a range of 30%-40% of the print area.

Each of the samples of Table 1 successfully achieved lamination between the printed area and the polycarbonate protective top layer laminated over the printed polycarbonate substrate. However, the larger the percentage of bridge surface area, the lesser will be the image quality (clarity) and the acceptability of any given quality of printed image will depend on the particular application for which the invention is used. For some applications the image quality may not be important (e.g. the image applied may be very simple in which case a lower resolution will have no material effect on the overall result), with the key objective or problem to be solved being the ability to laminate a thermoplastic layer over the printed substrate. In the samples of Table 1 the third sample, having a bridge surface area of 55% of the print area, produces the least desirable image quality.

The depth of the ink fill will depend on the printer settings used, for example, the ink jet printer used to print the image 20 of the illustrated embodiments was set to 600×600 dpi, 8 pass, fine (vs. standard), multi-pass. Surprisingly, however, irrespective of the settings, the applicant found that when the image 20 is printed onto the cell pattern it fills the recessed cells 25 only to a level which lies below the surfaces of the bridges 35 and does not cover the bridge surfaces. The reason for this is not known with certainty but one possibility is that different static electrical charges between the recessed image receiving surfaces 30 of the cells 25 and the surface of the bridges causes the ink to repel away from the bridge surfaces. It appears that this failure of the ink to cover the bridge surfaces, and the resulting exposure of the thermoplastic material of the bridge surfaces, enables the protective layer 45 to be lamination bonded to the substrate 15. Electrostatic Discharge Testing conducted on the embossed polycarbonate film substrate confirmed the attraction of the carbon particles was mainly in the recessed areas, and the surface or sub-surface bridge areas remained relatively clean.

For the illustrated embodiments, the thermoplastic substrate 15 is made by laminating together multiple layers of polycarbonate, chosen as the thermoplastic material, and the cell pattern is formed in the top polycarbonate layer by a preforming lamination plate that is embossed with a pattern which mirrors the cell pattern. When the substrate layers are laminated together by applying heat and pressure to them as per a conventional lamination process, they are pressed against the lamination plate which causes the layers to bond together to form the substrate 15 and at the same time form the desired pattern of cells 25 and bridges 35 in the surface of the substrate 15. Alternatively, instead of using hot lamination and a lamination plate to form the cell and bridge pattern in the substrate surface, the cell and bridge pattern could be formed by another process such as intaglio embossing, embossing the material of a thermoplastic film (layer) during the film extrusion process, by a hot stamp process, by ultrasonic lamination, by laser ablation or by mechanical means to drill or ablate the substrate surface to form the desired pattern of cells and bridges.

The details of the illustrated embodiment may be varied as considered expedient to a person skilled in the art and are not to be considered essential to the invention by reason only of inclusion in the embodiments illustrated herein. Rather, the invention is defined by the appended claims.

What is claimed is:

1. A method for laminating a thermoplastic layer to a printed thermoplastic substrate, the method comprising:
    (a) providing a printed thermoplastic substrate comprising a print area on which an image is printed, the print area comprising a pattern of cells separated by bridges, each cell comprising recessed image receiving surfaces below a nominal surface of the print area of the thermoplastic substrate which hold the ink of the printed image and the bridges having surface areas above the ink, the surface areas of the bridges comprising enough of the print area to provide lamination bonding areas; and, (b) using heat and pressure, laminating a thermoplastic layer to at least the print area of the thermoplastic substrate to form lamination bonding between the thermoplastic layer and the lamination bonding areas provided by the surface areas of the bridges.

2. The method of claim 1 whereby the thermoplastic layer is see-through and the image is a portrait.

3. The method of claim 2 whereby the surface area of the bridges is in a range of 10%-60% of the print area.

4. The method of claim 2 whereby the surface area of the bridges is in a range of 20%-50% of the print area.

5. The method of claim 2 whereby the surface area of the bridges is in a range of 30%-40% of the print area.

6. The method of claim 2 whereby the surface area of the bridges is about one third of the print area and the ink of the printed image fills the cells by about one third.

7. The method of claim 3 whereby each of the thermoplastic substrate and the thermoplastic layer comprise one or more layers of polycarbonate.

8. The method of claim 4 whereby each of the thermoplastic substrate and the thermoplastic layer comprise one or more layers of polycarbonate.

9. The method of claim 5 whereby each of the thermoplastic substrate and the thermoplastic layer comprise one or more layers of polycarbonate.

10. The method of claim 1 whereby the print area of the thermoplastic substrate is pre-formed by means of a process selected from the group consisting of intaglio embossing, embossing during a film extrusion process, a hot stamp process, ultrasonic lamination, laser ablation and mechanical ablation.

11. The method of claim 3 whereby the printing is by ink jet printing.

12. The method of claim 4 whereby the printing is by ink jet printing.

13. The method of claim 5 whereby the printing is by ink jet printing.

14. The method of claim 2 whereby the relative amount of the print area comprising the surface areas of the bridges is sufficiently small to provide a high quality for the printed image.

15. A method for laminating a see-through thermoplastic layer over at least a printed area of a thermoplastic substrate, the method comprising laminating the thermoplastic layer to the printed area of the thermoplastic substrate to form lamination bonding between the thermoplastic layer and the thermoplastic substrate, the printed area of the thermoplastic substrate comprising embossments recessed below the surface of the printed area and separated by bridges comprising surface areas for lamination bonding with the thermoplastic substrate, and the recessed embossments containing ink defining a printed image in the printed area.

16. The method of claim 15 wherein the printed image is a portrait.

17. The method of claim 16 wherein the percentage of the printed area comprising the surface areas of the bridges is selected for optimization of the quality of the printed image.

18. The method of claim 17 whereby the percentage of the printed area comprising the surface areas of the bridges is in the range of 10%-60%.

19. The method of claim 17 whereby the percentage of the printed area comprising the surface areas of the bridges is in the range of 20%-50%.

20. The method of claim 17 whereby the percentage of the printed area comprising the surface areas of the bridges is in the range of 30%-40%.

* * * * *